US007113957B1

(12) United States Patent
Cohen et al.

(10) Patent No.: US 7,113,957 B1
(45) Date of Patent: Sep. 26, 2006

(54) ROW HASH MATCH SCAN JOIN USING SUMMARY CONTEXTS FOR A PARTITIONED DATABASE SYSTEM

(75) Inventors: Steven B. Cohen, Redondo Beach, CA (US); Paul L. Sinclair, Manhattan Beach, CA (US)

(73) Assignee: NCR Corporation, Dayton, OH (US)

( * ) Notice: Subject to any disclaimer, the term of this patent is extended or adjusted under 35 U.S.C. 154(b) by 325 days.

(21) Appl. No.: 10/106,699

(22) Filed: Mar. 26, 2002

Related U.S. Application Data

(63) Continuation-in-part of application No. 10/029,082, filed on Dec. 20, 2001, now Pat. No. 6,772,163.

(51) Int. Cl.
*G06F 17/00* (2006.01)
(52) U.S. Cl. .................... 707/102; 707/104.1; 707/100; 707/10; 707/4; 707/2
(58) Field of Classification Search ............... 707/2, 707/4, 10, 100–102, 104.1
See application file for complete search history.

(56) References Cited

U.S. PATENT DOCUMENTS 5,794,229 A * 8/1998 French et al. ................ 707/2
5,870,746 A * 2/1999 Knutson et al. ............ 707/101
6,073,129 A * 6/2000 Levine et al. ................ 707/4
6,366,911 B1 * 4/2002 Christy ........................ 707/7
6,523,036 B1 * 2/2003 Hickman et al. ............ 707/10
6,772,163 B1 * 8/2004 Sinclair et al. ............ 707/100

* cited by examiner

*Primary Examiner*—Safet Metjahic
*Assistant Examiner*—Sana Al-Hashemi
(74) *Attorney, Agent, or Firm*—Baker Botts LLP; John D. Cowart; Harden E. Stevens, III

(57) ABSTRACT

A method, computer system, and computer program are claimed for selecting rows from first and second tables each having rows containing values in columns. In at least the first table, the rows are divided into partitions at least one of which is populated by one or more rows. The method, computer system, and computer program include creating a plurality of partition contexts, each partition context corresponding to a populated partition and storing at least a first value associated with a row. The lowest first value stored by the partition context is determined. Rows with a particular first value are identified by reading the partition contexts, creating a temporary file context corresponding to one of the partition contexts, the temporary file context including location data for a data block of rows in memory, and reading rows in memory.

27 Claims, 7 Drawing Sheets

ROW HASH MATCH SCAN JOIN USING SUMMARY CONTEXTS FOR A PARTITIONED DATABASE SYSTEM

CROSS-REFERENCE TO RELATED APPLICATION

This is a continuation-in-part of application Ser. No. 10/029,082, entitled "REDUCED MEMORY ROW HASH MATCH SCAN JOIN FOR A PARTITIONED DATABASE SYSTEM," by Paul Laurence Sinclair and Kuorong Chiang filed on Dec. 20, 2001, now U.S. Pat. No. 6,772,163.

BACKGROUND

Data organization is important in relational database systems that deal with complex queries against large volumes of data. Relational database systems allow data to be stored in tables that are organized as both a set of columns and a set of rows. Standard commands are used to define the columns and rows of tables and data is subsequently entered in accordance with the defined structure. The defined table structure is logically maintained, but may not correspond to the physical organization of the data. For example, the data corresponding to a particular table may be split up among a number of physical hardware storage facilities.

Users in relational database systems require a minimum time possible for execution of complex queries against large amounts of data. Different physical types of storage, for example random access memory and hard drives, incur different length delays. In addition, writing to memory or a hard drive is often slower than reading an equivalent amount of data from memory or a hard drive. The organization of data corresponding to tables defined in a relational database system may determine the number of writes and reads that need to be performed in order to execute a common query. If the data is properly organized, in responding to queries performance can be improved by taking advantage of that organization and searching only part of the data. If the data is not organized in any way, it will often need to be searched in its entirety to satisfy a query or copied and restructured into a useful organization.

Given a particular change in the organization of data, particular types of searches or other operations performed on the data may be adversely impacted in terms of efficiency if they are performed without any adjustment. Many factors must be addressed to adjust a search that is to be performed with respect to a new organization of data. Such factors include, but are not limited to, the manner in which the data is stored, the file system that identifies the location of the data and various other information about the data, and the desired outcome of the search. Failure to consider and address any one of those factors can result in an inefficient search.

SUMMARY

In general, in one aspect, the invention features a method for selecting rows from first and second tables each having rows containing values in columns. In at least the first table, the rows are divided into partitions at least one of which is populated by one or more rows. The method includes creating a plurality of partition contexts, each partition context corresponding to a populated partition and storing at least a first value associated with a row. The lowest first value stored by the partition context is determined. Rows with a particular first value are identified by reading the partition contexts, creating a temporary file context corresponding to one of the partition contexts, the temporary file context including location data for a data block of rows in memory, and reading rows in memory.

In one implementation of the invention, rows can be stored in order of their corresponding first value within the partitions. The first value corresponding to a row can be the result of a hash function applied to the values in one or more columns of that row.

In general, in another aspect, the invention features a database system for iteratively selecting rows from a first table. The first table includes rows and columns and is divided by rows into partitions. At least one of the partitions in the table is populated by one or more rows. The system includes one or more nodes, a plurality of CPUs, each of the one or more nodes providing access to one or more CPUs, and a plurality of processes, each of the one or more CPUs providing access to one or more virtual processes. Each process is configured to manage data, including the partitioned database table, stored in one of a plurality of data-storage facilities. A partitioned table access component is configured to select rows from at least the first table by creating a plurality of partition contexts, each partition context corresponding to a populated partition and storing at least a first value associated with a row. The lowest first value stored by the partition context is determined. Rows with a particular first value are identified by reading the partition contexts, creating a temporary file context corresponding to one of the partition contexts, the temporary file context including location data for a data block of rows in memory, and reading rows in memory.

In general, in another aspect, the invention features a computer program, stored in a tangible medium, for selecting rows from a first table. The first table has rows and columns and is divided by row into partitions. At least one of the partitions is populated by rows. The program includes executable instructions that cause a computer to create a plurality of partition contexts, each partition context corresponding to a populated partition and storing at least a first value associated with a row. The lowest first value stored by the partition context is determined. Rows with a particular first value are identified by reading the partition contexts, creating a temporary file context corresponding to one of the partition contexts, the temporary file context including location data for a data block of rows in memory, and reading rows in memory.

Other features and advantages will become apparent from the description and claims that follow.

DETAILED DESCRIPTION

Figure 1:
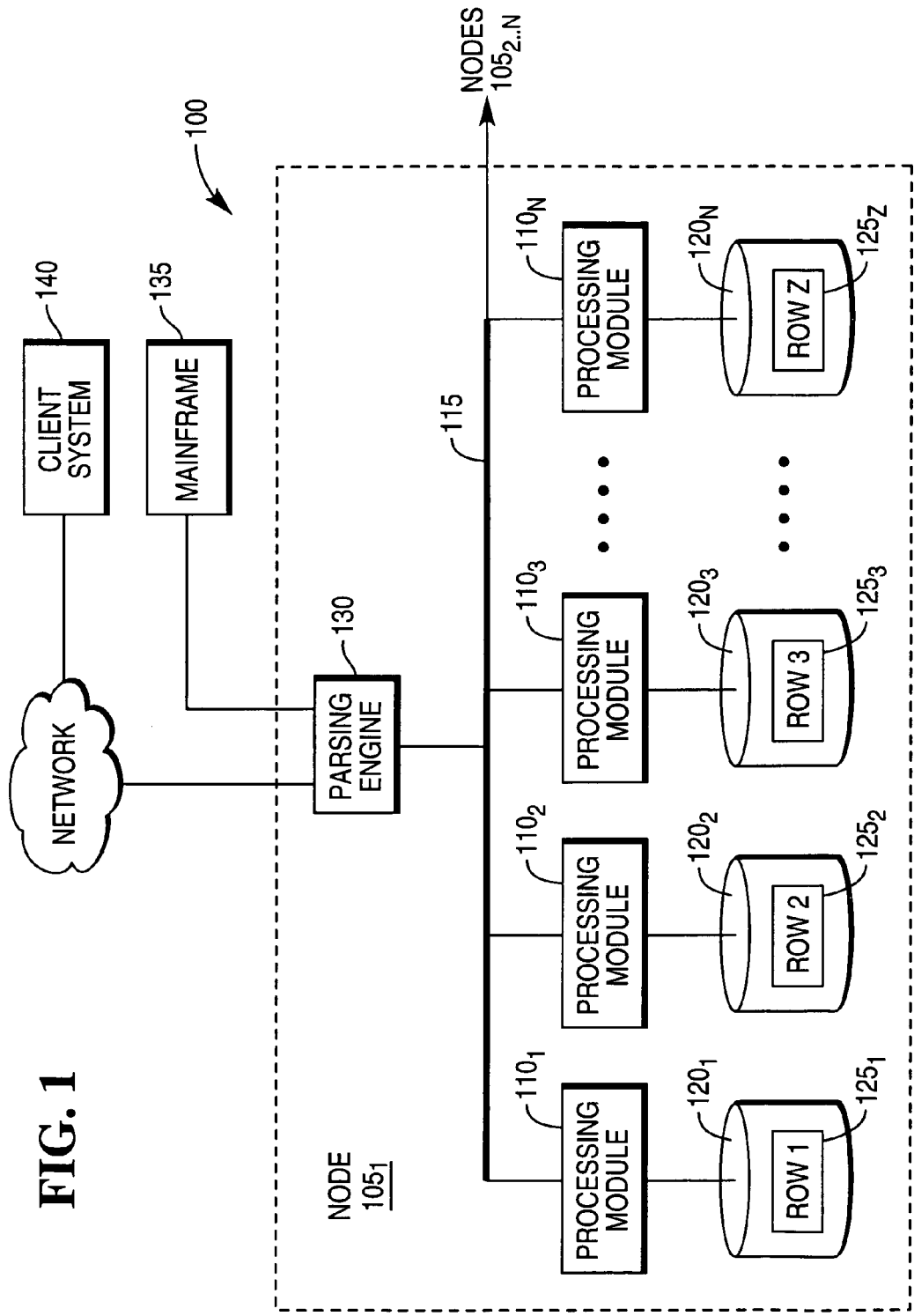
FIG. 1 is a block diagram of a node of a database system.

The partitioned table storage technique disclosed herein has particular application, but is not limited, to large databases that might contain many millions or billions of records managed by a database system ("DBS") 100, such as a Teradata Active Data Warehousing System available from NCR Corporation. FIG. 1 shows a sample architecture for one node $105_1$ of the DBS 100. The DBS node 105, includes one or more processing modules $110_{1...N}$, connected by a network 115, that manage the storage and retrieval of data in data-storage facilities $120_{1...N}$. Each of the processing modules $110_{1...N}$ may be one or more physical processors or each may be a virtual processor, with one or more virtual processors running on one or more physical processors.

For the case in which one or more virtual processors are running on a single physical processor, the single physical processor is shared on a round robin basis between the set of N virtual processors.

For the case in which N virtual processors are running on an M-processor node, the node's operating system schedules the N virtual processors to run on its set of M physical processors. If there are 4 virtual processors and 4 physical processors, then typically each virtual processor would run on its own physical processor. If there are 8 virtual processors and 4 physical processors, the operating system would schedule the 8 virtual processors against the 4 physical processors, in which case the virtual processors would employ the physical processors on a round robin basis.

Each of the processing modules $110_{1...N}$ manages a portion of a database that is stored in a corresponding one of the data-storage facilities $120_{1...N}$. Each of the data-storage facilities $120_{1...N}$ includes one or more disk drives. The DBS may include multiple nodes $105_{2...N}$ in addition to the illustrated node $105_1$, connected by extending the network 115.

The system stores data in one or more tables in the data-storage facilities $120_{1...N}$. The rows $125_{1...Z}$ of the tables are stored across multiple data-storage facilities $120_{1...N}$ to ensure that the system workload is distributed evenly across the processing modules $110_{1...N}$. A parsing engine 130 organizes the storage of data and the distribution of table rows $125_{1...Z}$ among the processing modules $110_{1...N}$. The parsing engine 130 also coordinates the retrieval of data from the data-storage facilities $120_{1...N}$ in response to queries received from a user at a mainframe 135 or a client computer 140. The DBS 100 usually receives queries and commands to build tables in a standard format, such as SQL.

The rows $125_{1...Z}$ are distributed across the data-storage facilities $120_{1...N}$ by the parsing engine 130 in accordance with their primary index. The primary index defines the one or more columns of the rows that are used for calculating a hash value. The function that produces the hash value from the values in the columns specified by the primary index is called the hash function. Some portion, possibly the entirety, of the hash value is designated a "hash bucket". The hash buckets are assigned to data-storage facilities $120_{1...N}$ and associated processing modules $110_{1...N}$ by a hash bucket map. The characteristics of the columns chosen for the primary index determine how evenly the rows are distributed.

Figure 2:
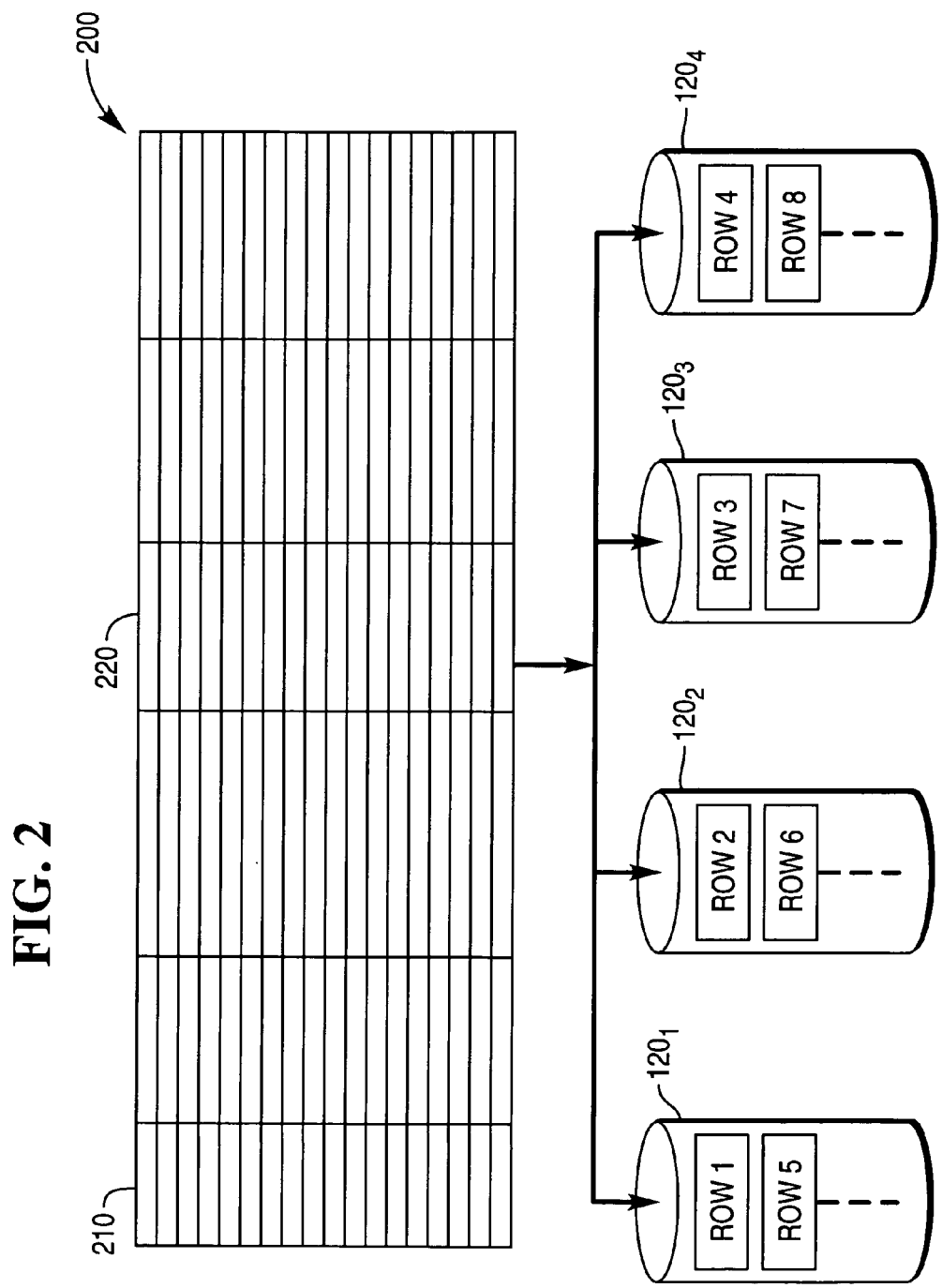
FIG. 2 is a flow diagram of a table distribution process.

FIG. 2 shows one implementation of how the rows of a table are distributed. The table 200 contains a plurality of rows and is stored in a plurality of data storage facilities $120_{1-4}$ by the parsing engine 130, shown in FIG. 1. For example, two columns 210, 220 can be designated as the primary index when the table is created. The hash function is then applied to the contents of columns 210, 220 for each row. The hash bucket portion of the resulting hash value is mapped to one of the data storage facilities 12014 and the row is stored in that facility. For example, if the primary index indicates a column containing a sequential row number and the hash function is the sum of the value one and the remainder when the sequential row number minus the value one is divided by four, the first eight rows will be distributed as shown in FIG. 2.

Queries involving the values of columns in the primary index can be efficiently executed because the processing module lion having access to the data storage facility $120_n$ that contains the row can be immediately determined. For example, referring to FIG. 2, if values from row 2 are desired, the parsing engine 130 can apply the hashing function to determine that only processing module $110_2$ needs to be used. As another example, an equality join on the primary index columns of two tables that have the same primary index is more efficient at least in the sense that all of the rows that need to be joined are found in the same data storage facility $120_n$ and no movement of information from rows between the facilities is necessary.

Figure 3:
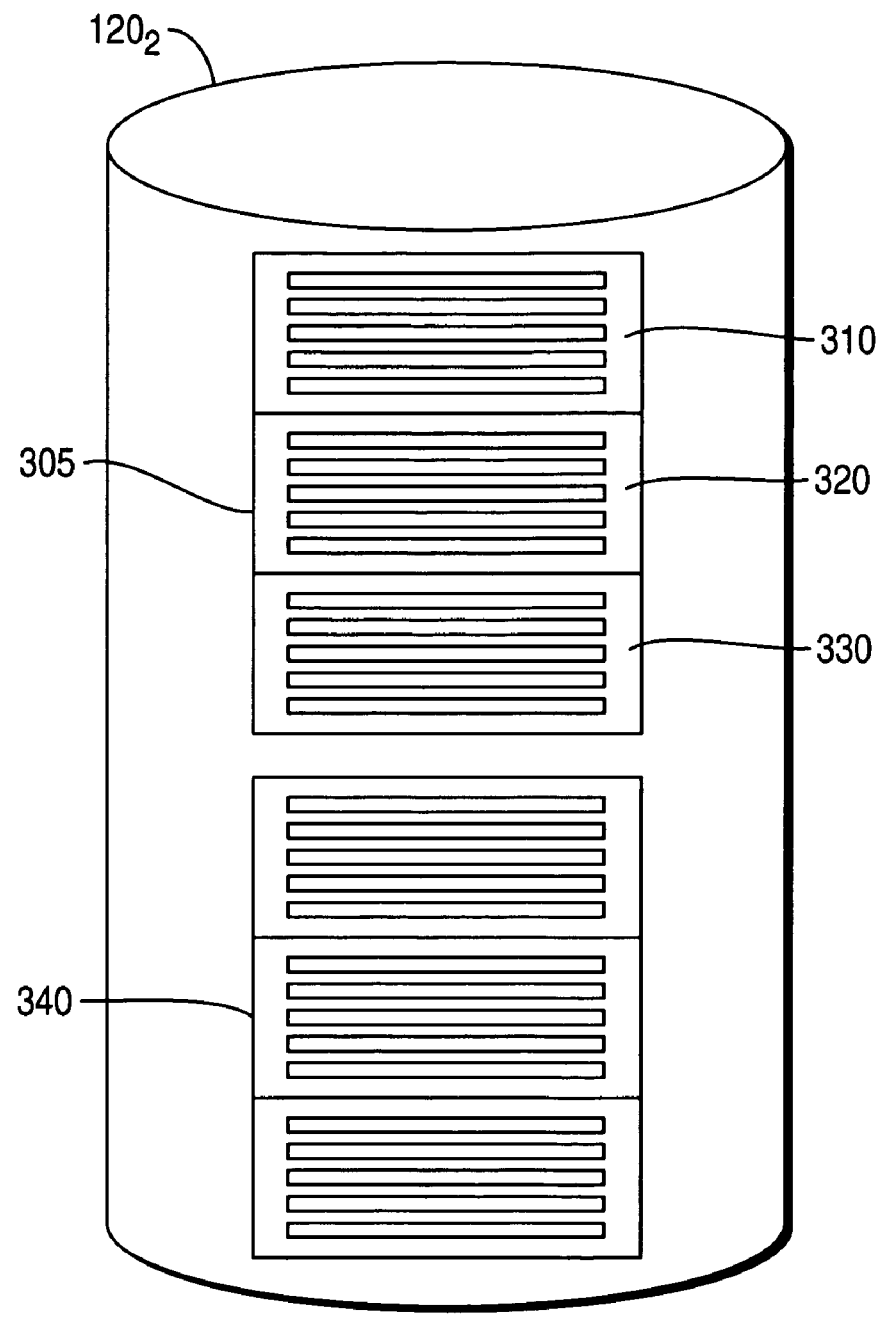
FIG. 3 illustrates an example of rows from two partitioned tables residing in a data storage facility.

While the primary index of a table can be chosen for equality joins, for example the order number column of an order table, additional design features can make range searches, for example a range of dates from the date column, more efficient. Referring to FIG. 3, a partitioned database storage facility $120_2$ is shown. Rows from two partitioned tables 305 and 340 are organized within the storage facility $120_2$ in accordance with a row identification (row ID), which can include values associated with a partition function as well as values associated with the hash function and a uniqueness value. The rows stored in the storage facility $120_2$ are ordered at a top level by the result of the partition function. As a result, a first group of rows 310 has one partition function value. A second group of rows 320 has another partition function value. A third group of rows 330 has a third partition value. The groups 310, 320, 330 are ordered by their partition function values and are also known as partitions.

The rows are also sorted within each partition. For example, the first partition 310 contains five rows. Those rows are stored within that partition 310 in the order of the hash result for each row. The hash result therefore acts as a sorting value. A uniqueness value is also maintained for each row. In one implementation, no two rows with the same partition and hash value in a table can have the same uniqueness value. The uniqueness values are determined when the rows are added to the table. For example, a sequential number (the next uniqueness number after the highest one currently being used) or any currently unused number can be used as the uniqueness value. If two rows are in the same partition and have the same hash value, their order is determined by their uniqueness values, which by definition cannot be identical. The uniqueness value does not play a role in ordering rows that have different partition or hash values. In another implementation, uniqueness values are not assigned to the rows and the order of rows with identical hash values is not determined.

A partition function can return a number for a row based on the range of values into which that row's value in a certain column falls. For example, if an order table in a database has the order number column as that table's primary index, the partition function can correspond to the month of the order date. In that situation, the rows of the order table would be distributed to storage facilities based on the result of applying the hash function to the order number. In each storage facility, the rows would be ordered based on a monthly range of dates. For example, the first partition 310 could include all rows for orders in January 2001. The second partition 320 could include all rows for orders in February 2001. Within each partition the rows are in the order of the hash value and, where hash values are the same, in order by uniqueness value. Such a partitioned table could be efficiently searched on ranges by eliminating partitions from the required search. For example, if all orders for a certain product during a two month period are desired, only two partitions would need to be checked for the specified product. The monthly range is just one example of a possible partition function. Any type of function can be used.

For one implementation of joining two tables or other data structures in a DBS 100, rows to be joined are (1) within the same data storage facility and (2) organized and processed by the associated processing module such that they can be matched in accordance with whatever conditions are specified by the join command, i.e., the join conditions. When one of the join conditions is on the one or more primary index columns, the hash result of which is used to distribute rows among storage facilities, the first condition is satisfied. This condition is satisfied, for example, when the join condition includes the entire set of primary index column(s) and the optimizer chooses to hash on this set of column(s). Under these circumstances, there is the additional benefit that the tables involved in the join can be directly accessed without spooling or sorting. With regard to the second condition, if the rows are sorted in hash order in each storage facility, the rows can easily be matched in order. When one of the join conditions is on the one or more primary index columns, rows with the same hash value from one table or data structure can only potentially match with rows with the same hash value from the other table or data structure, because identical primary index column values result in identical hash values. Identical hash values, however, do not necessarily indicate identical primary index column values, because more than one primary index column value can result in the same hash value. Such primary index column values are sometimes referred to as hash synonyms. A row hash match scan method skips over rows from one table that do not have rows with corresponding hash values in the other table. For example, if on average there are 4 rows with the same hash in each table, for each row in one table the join conditions will only need to be evaluated for the 4 rows in the other table with the same hash instead of all the rows in the other table.

In one implementation of a DBS table with a partitioned primary index, the rows in each storage facility are divided up into partitions and ordered by hash within each partition. As a result, rows with the same hash value may be in different partitions rather than together as they would be if they were ordered only by hash. One option for executing a join command specifying a condition on the primary index columns in such a table is to copy the table rows and sort the copy by hash so that the row hash match scan method can be performed on the sorted copy. For a nonpartitioned table that has a primary index on the join columns, this extra copying and sorting is unnecessary and the join can take place directly from the table.

One implementation of a process of joining two tables, at least one of which is partitioned, using a row hash match scan algorithm involves creating a file context for each populated partition. Such a file context would store information, such as the hash value, about a row of the partition and would include location information, sometimes called a pointer, for where that row is in memory. The actually data that includes the values of that row would be maintained in memory. In some implementations, a particular number of rows are stored together in a block and the block is maintained in memory as long as the file context remains. If the number of populated partitions is large, the file contexts and associated blocks of row data can utilize a proportion of memory that impedes the efficient processing of other database commands.

Figure 4:
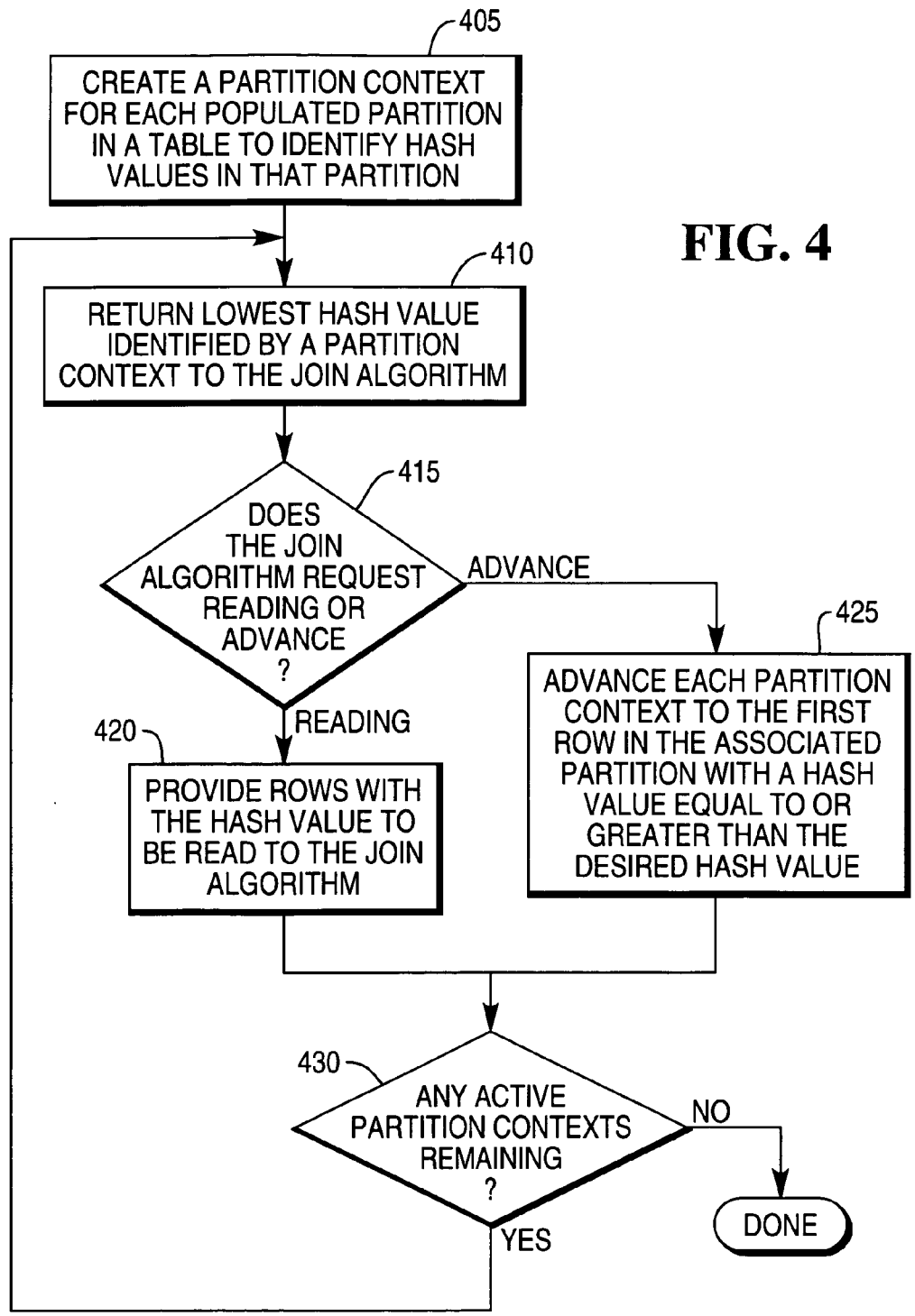
FIG. 4 is a flow chart of an algorithm for selecting rows from a partitioned table where partition contexts are assigned to each populated partition in the table.

Another implementation of a process of joining two tables, at least one of which is partitioned, using a row hash match scan algorithm involves creating a partition context for each populated partition, as will be described further with reference to FIGS. 4–7. According to one implementation of this process, as depicted in FIG. 4, selecting rows by hash value from a partitioned database table for a row hash match scan algorithm includes several steps. If a partitioned table and a nonpartitioned table are joined, the process can be used on the partitioned table. If two partitioned tables are being joined, the process can be used on both tables. First, the process creates a partition context for each populated partition in the one or more partitioned tables specified in the join command to track hash values in that partition 405 (more particularly described with respect to FIG. 5). In an alternate implementation, partition contexts are only created for partition that include rows that meet condition set by the join command. For example, if a partition includes three rows, but none of those rows specifies an order from a supplier specified in the join command, no partition context is created in the alternate implementation.

The process then determines the lowest hash value identified by the partition contexts for the table and provides that value to the join algorithm 410. The join algorithm requests a reading of a hash value or an advance to a hash value 415. If the join algorithm requests a reading, rows in the partitioned table with that hash value are provided to the algorithm 420 (more particularly described with respect to FIG. 6). If the join algorithm requests an advance, each partition context for the partitioned table is modified, if necessary, to identify the first row with the desired hash value or a greater hash value 425 (more particularly described with respect to FIG. 7). If active partition contexts remain 430, the lowest identified hash value is again provided to the join algorithm 410.

If no active partition contexts remain 430, the process of selecting rows is finished. In one implementation, partition contexts are removed when the last row in the partition is reached. In another implementation, each partition context includes a no next row indicator that is set when the last row is reached and that partition context is no longer active. In one implementation, when their are no active partition contexts, the join algorithm receives a signal indicating that the partitioned table has no rows with hash values equal to or greater than the last requested hash value.

Figure 5:
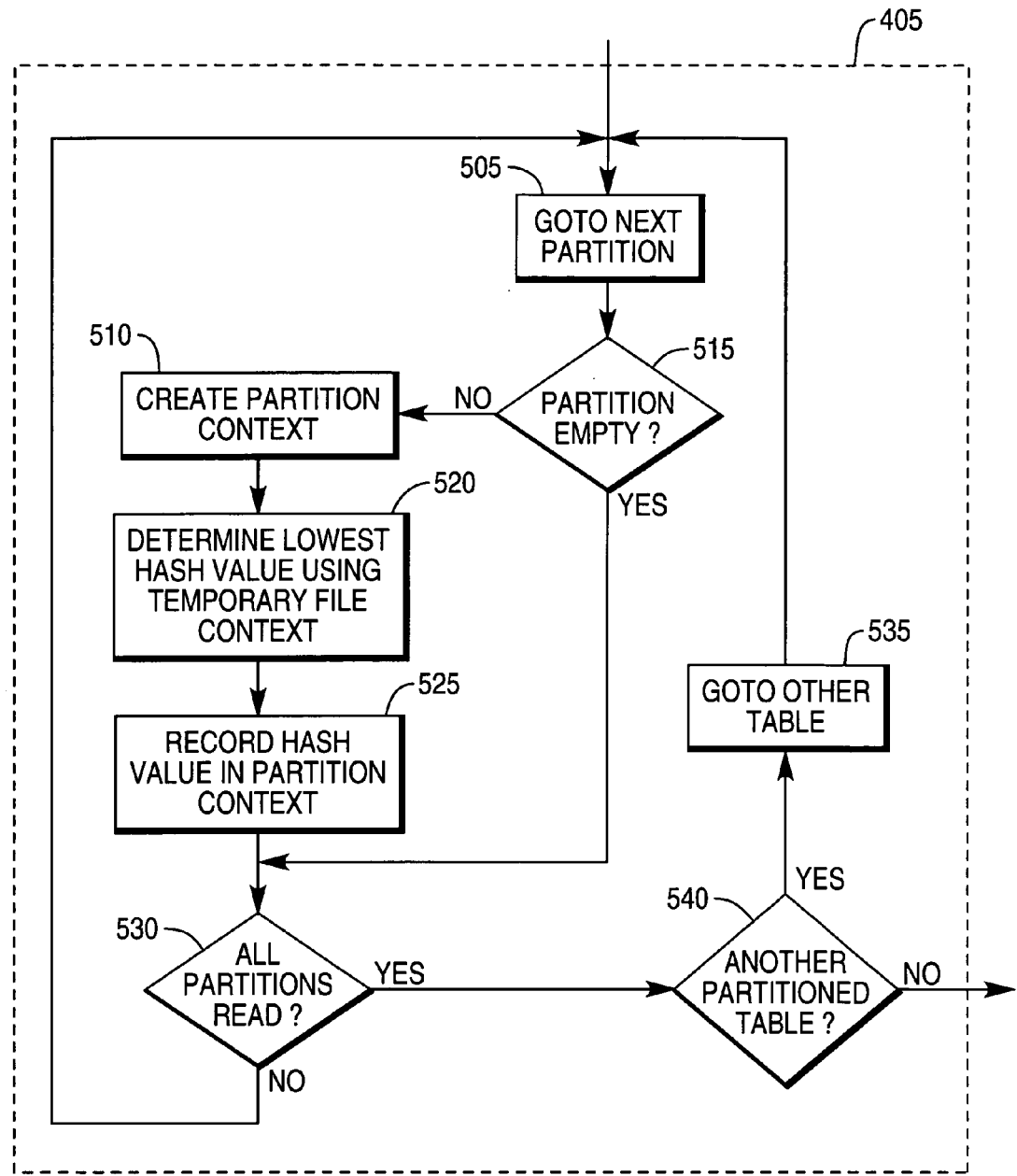
FIG. 5 is a flow chart of an algorithm for creating a partition context for each populated partition in one or more tables.

One implementation of the process of creating partition contexts for all populated partitions is depicted in FIG. 5 and involves examining the next partition (or the first partition at the very beginning of the process) in a partitioned table 505. If that partition is empty 515 and unexamined partitions still exist in the table 530, the next partition is checked to see if it contains rows 515. If that partition is populated with one or more rows 515, an empty partition context for that partition is created 510. The associated partition is then examined using a temporary file context to find the row containing that partition's lowest hash value or, in another implementation, to find the row containing that partition's lowest hash value greater than or equal to a given hash value 520. Once a value meeting those criteria is found in a row in the partition the hash value is stored in that partition's partition context 525. In one implementation, the partition context is not created until the initial location data and hash value for it are determined. If unexamined partitions still exist in the table 530, the next partition is examined 505, and the process is repeated. If all partitions in the table have been examined and another table specified in the join command is a partitioned table 540, the partitions in the next table are examined 535. When all partitions in all specified, partitioned tables have been examined, the process of creating partition contexts is complete.

In one specific implementation, the process of creating partition contexts entails, first, a temporary file context is created and the file system is requested to find a first data block with a hash value equal to or higher than 'hhhhhhhh' (hexadecimal notation). The value 'hhhhhhhh' is the desired starting hash value or '00000000' if it is desired to find the first hash value in the table. The join algorithm picks one of the two tables/spools in the join and finds its lowest hash value; then using that hash value, probes into the other table/spool. The file system positions to the first data block containing a row with equal or higher hash value than the desired hash value, reads that data block and then positions to the first row in that data block with an equal or higher value than the desired hash value. The hash value for that row is stored in a partition context and the temporary file context is deleted. Another temporary file context is created. The file system is requested to find the next row using that temporary file context with a hash value equal to or higher than 'hhhhhh' in a partition that is at least one higher than the partition number in the row identification (row ID) of the first row found. This is continued until no row is found, creating as many partition contexts as needed in the process. The partition contexts are linked together so that the partition contexts can easily be traversed. For example, the partition contexts can be members of an array, with position in the array corresponding to the partition of the partition context. In another implementation, the partition contexts are separate data structures that include location data for the next partition context. If, in a specific implementation, the number of partitions is limited to at most 256, no more than 256 partition contexts are created.

Referring again to FIG. 4, the lowest hash value of the new partition contexts for a partitioned table is determined. In one implementation of this step, the hash value in the first partition context for the partitioned table is examined and stored as the "lowest" hash value. Then, the hash value in the next partition context for that table is examined, and if this new value is smaller than the "lowest" hash value, the new value is stored as the "lowest" hash value. That step is repeated until every partition context has been examined, at which point the "lowest" hash value has been determined.

Figure 6:
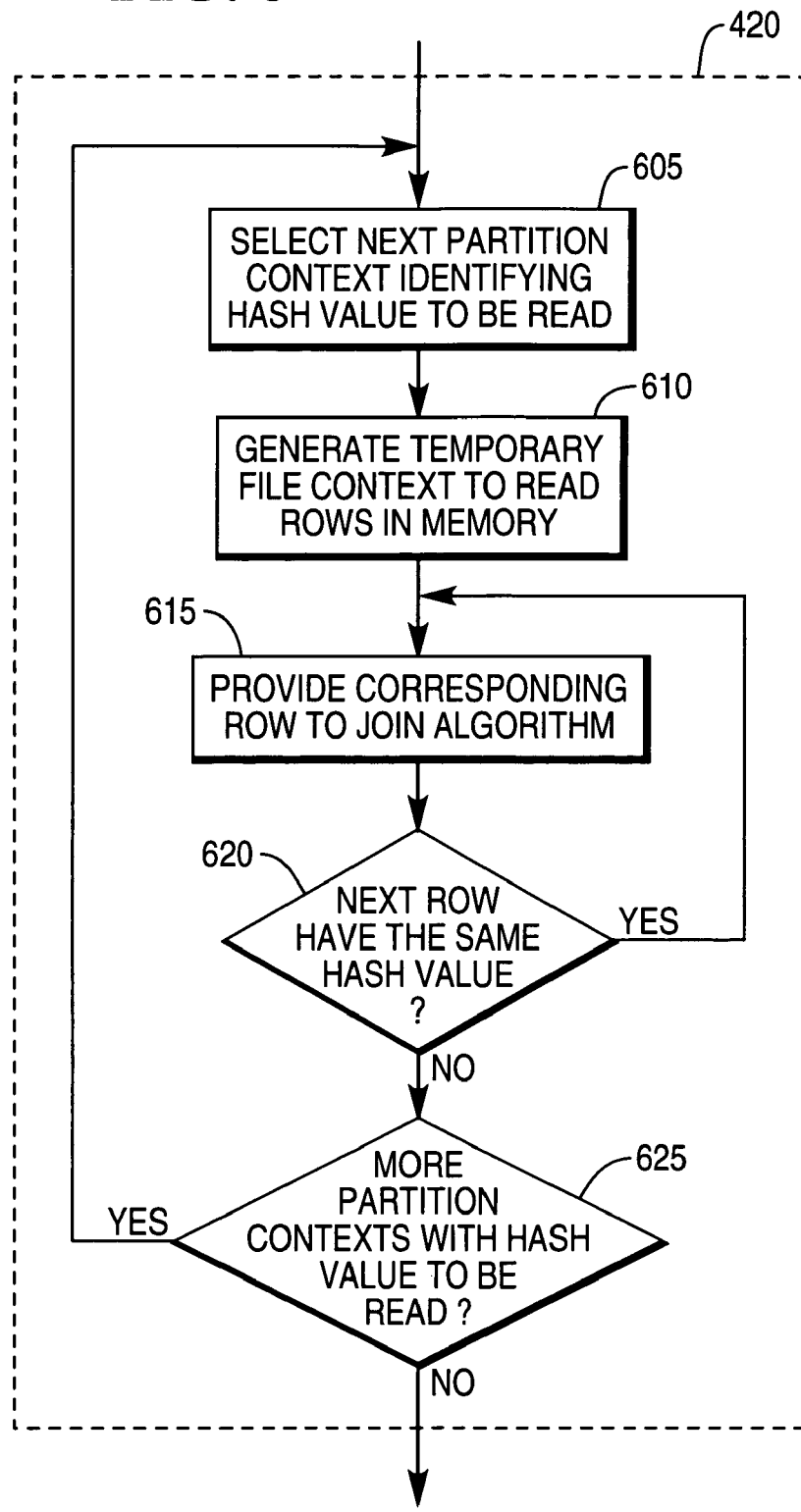
FIG. 6 is a flow chart of an algorithm for providing rows with a particular hash value.

As depicted in FIG. 4, the join algorithm can request that rows having a particular hash value be read from a partitioned table 420. One implementation for reading rows is depicted in FIG. 6 and begins with selecting the next partition (or the first partition at the very beginning of the process) that identifies the hash value to be read 605. A temporary file context is generated 610 to provide the row data to the join algorithm 615. The next row in the partition is then checked to see if it has the same hash value 620. If it does, its data is also provided to the join algorithm. Those two steps continue until a row with a different hash value is located or no more rows are in the partition. If more partition contexts identifying the hash value to be read remain 625, rows are provided using the data via a temporary file context 605. If not, all the rows have been provided. In one case, the join algorithm can request that rows with the same hash value be read again. For example, insufficient available memory requires that if there are many rows with the same hash value, they are compared piecemeal with rows loaded into memory in partial sets.

Figure 7:
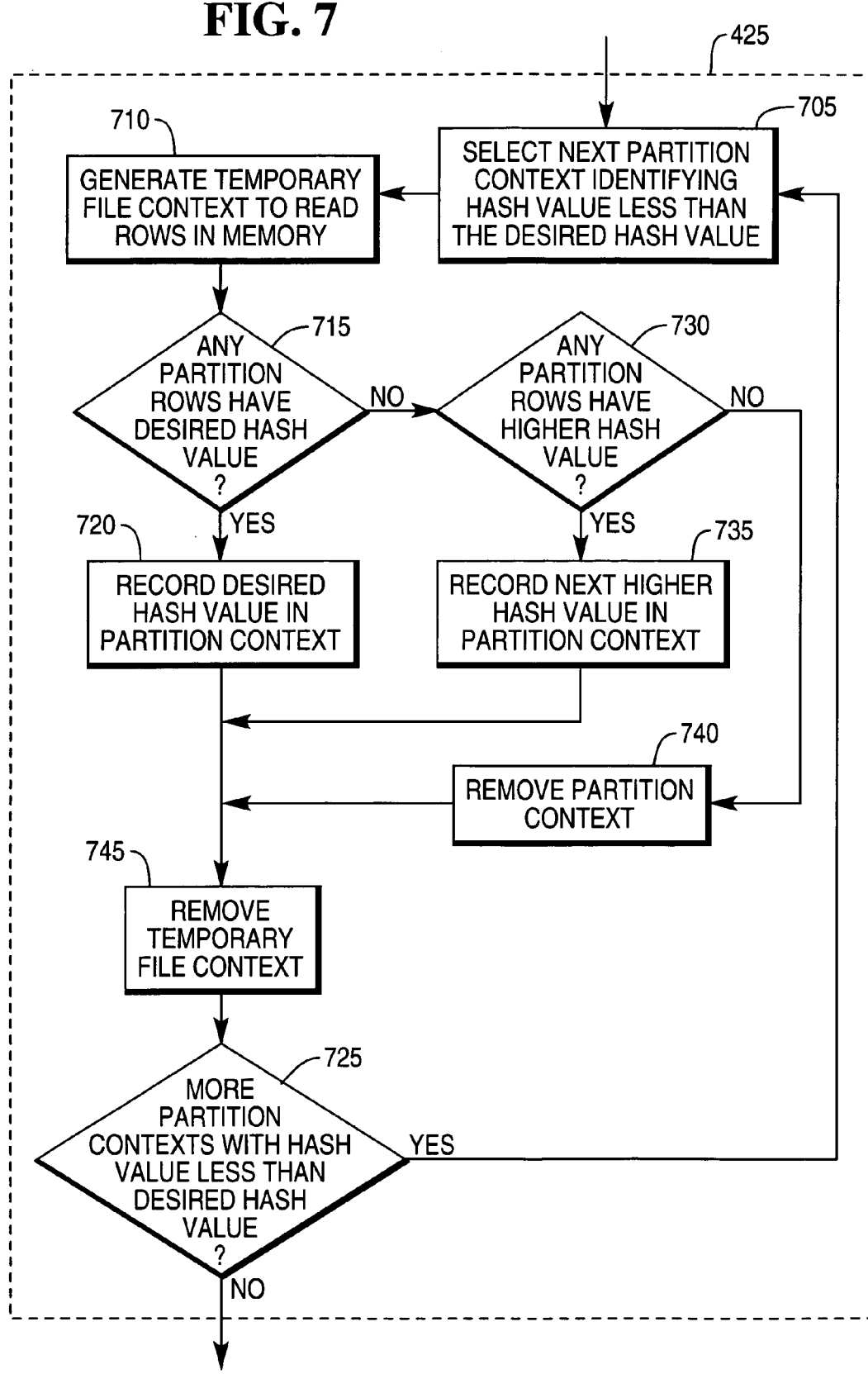
FIG. 7 is a flow chart of an algorithm for advancing the partition contexts.

FIG. 7 depicts one implementation of the process of advancing each partition context to the first row in the associated partition that has a hash value greater than or equal to a desired hash value 425. The implementation begins with selecting the next partition (or the first partition at the very beginning of the process) that identifies a hash value less than the desired value 705. If a partition identifies a hash value greater than or equal to the desired hash value, it does not need to be advanced, though in some implementations it could be (for instance, if residual conditions indicate that the found row is not applicable). Once a partition context with a lesser hash value is identified, a temporary file context is generate to access row data 710. The rows in the associated partition are examined for the desired hash value 715. If one or more such rows exist, the hash value for the first such row is recorded in the partition context 720. If not, the rows in the associated partition are examined via the temporary file context for a hash value greater than the desired hash value 730. If one or more such rows exist, the hash value for the first such row is recorded in the partition context 735. If no rows with hash values greater than or equal to the desired hash value are present in the partition, the partition context is removed 740. In an alternate implementation, a no next row indicator in the partition context is set. The temporary file context is removed 745. The remaining partition contexts are then examined for identified hash values less than the desired hash value 725 and the process repeats for any such partition contexts.

In one implementation, the above-described algorithm for selecting rows from a partitioned table for use by a join algorithm can be used whenever a database system function, not necessarily a join algorithm, needs to access rows of a partitioned table in hash value order. The database system function can request rows as though the table was ordered only by hash value and the algorithm will use partition contexts and temporary file contexts to deliver the rows appropriately. Thus, for example, a join command specifying two tables can invoke a join algorithm that will operate equivalently without regard to whether none, one, or both tables are partitioned. While the above implementations discuss the use of hash values, in alternate implementations other values associated with the various rows can be used.

Thus, the system and method described above permits joining of two tables either one or both of which can have partitioned primary indexes using a row hash match scan algorithm even when the number of partitions is very large, by limiting the number of file contexts and data blocks needed to be kept in memory at any one time.

The text above describes one or more specific implementations of a broader invention. The invention is also carried out in a variety of alternative implementations and thus not limited to those directed described here. For example, while the invention has been described in terms of a database management system that uses a massively parallel processing architecture, other types of database systems and architectures, including databases having a symmetric multiprocessing architecture, are also useful in carrying out the invention. As another example, an implementation has been described with the sorting value as a hash value that is also used for distributing rows among storage facilities. Other types of sorting values are also useful in carrying out the invention. Many other implementations are also within the scope of the following claims.

What is claimed is:

1. A computer-implemented method for selecting rows from a partitioned database table, comprising the steps of:
   a. creating a plurality of partition contexts, each partition context corresponding to a populated partition and storing at least a first value associated with a row;
   b. determining the lowest first value stored by the partition contexts; and
   c. identifying rows with a particular first value including:
   reading the partition contexts;
   ii. creating a temporary file context corresponding to one of the partition context, the file context including location data for a data block of rows in memory; and
   iii. reading rows from the data block rows in memory.

2. The method of claim 1, where rows are ordered within the populated partitions in accordance with the first value for each row.

3. The method of claim 1, where the first values stored are based at least in part on values in one or more specified columns of the associated rows.

4. The method of claim 3, where the first values stored by the partition contexts are the result of a hash function applied to values in one or more specified columns of the associated rows.

5. The method of claim 1, where the partition contexts are stored in an array.

6. The method of claim 5, where the position of a partition context in the array corresponds to the partition to which that partition context corresponds.

7. The method of claim 1, further comprising the step of:
   d. updating each partition context to store the first value for a row in the associated partition with a first value equal to or greater than a desired first value.

8. The method of claim 1, where the partition contexts store a number identifying the corresponding partition.

9. The method of claim 1, where the partition contexts store a no next row indicator.

10. A database system for selecting rows from a partitioned database table, the partitioned database table including rows and columns and being divide into partitions and at least one of the partitions in the table being populated by one or more rows, the system comprising:
   one or more nodes;
   a plurality of CPUS, each of the one or more nodes providing access to one or more CPUS;
   a plurality of processes, each of the one or more CPUS providing access to one or more virtual processes;
   each process configured to manage data including the partitioned database table, stored in one of a plurality of data-storage facilities;
   a partitioned table access component configured to select rows from the table by:
   a. creating a plurality of partition contexts, each partition context corresponding to a populated partition and storing at least a first value associated with a row;
   b. determining the lowest first value stored by the partition contexts; and
   c. identifying rows with a particular first value including:
   i reading the partition contexts;
   ii. creating a temporary file context corresponding to one of the partition contexts, the temporary file context including location data for a data block of rows in memory; and
   iii. reading rows from the data block rows in memory.

11. The system of claim 10, where rows are ordered within the populated partitions in accordance with the first value for each row.

12. The system of claim 10, where the first values stored are based at least in part on values in one or more specified columns of the associated rows.

13. The system of claim 12, where the first values stored by the partition contexts are the result of a hash function applied to values in one or more specified columns of the associated rows.

14. The system of claim 10, where the partition contexts are stored in an array.

15. The system of claim 14, where the position of a partition context in the array corresponds to the partition to which that partition context corresponds.

16. The system of claim 10, where the partitioned table access component is configured to select rows from the table by:
   d. updating each partition context to store the first value for a row in the associated partition with a first value equal to or greater than a desired first value.

17. The system of claim 10, where the partition contexts store a number identifying the corresponding partition.

18. The system of claim 10, where the partition contexts store a no next row indicator.

19. A computer program, stored in a tangible medium, for selecting rows from a partitioned database table, the program comprising executable instructions that cause a computer to:
   a. create a plurality of partition contexts, each partition context t corresponding to a populated partition and storing at least a first value associated with a row;
   b. determine the lowest first value stored by the partition contexts; and
   c. identify rows with a particular first value by:
   i. reading the partition contexts;
   ii. creating a temporary file context corresponding to one of the partition contexts, the temporary file context including location data for a data block of rows in memory; and
   iii. reading rows from the data block rows in memory.

20. The computer program of claim 19, where rows are ordered within the populated partitions in accordance with the first value for each row.

21. The computer program of claim 19, where the first values stored are based at least in part on values in one or more specified columns of the associated rows.

22. The computer program of claim 21, where the first values stored by the partition contexts are the result of a hash function applied to values in one or more specified columns of the associated rows.

23. The computer program of claim 19, where the partition contexts are stored in an array.

24. The computer program of claim 23, where the position of a partition context in the array corresponds to the partition to which that partition context corresponds.

25. The computer program of claim 19, further comprising executable instructions that cause a computer to:
   d. update each partition context to store the first value for a row in the associated partition with a first value equal to or greater than a desired first value.

26. The computer program of claim 19, where the partition contexts store a number identifying the corresponding partition.

27. The computer program of claim 19, where the partition contexts store a no next row indicator.

* * * * *